Patented Mar. 19, 1935

1,994,641

UNITED STATES PATENT OFFICE 1,994,641

NITROPHENYLTHIOGLYCOLLIC ACIDS

Norman Hulton Haddock and Frank Lodge, Blackley, Manchester, England, assignors to Imperial Chemical Industries Limited, a corporation of Great Britain No Drawing. Application August 11, 1933, Serial No. 684,750. In Great Britain August 17, 1932

2 Claims. (Cl. 260—108)

This invention relates to a new process for the manufacture of a dinitrophenylthioglycollic acid and for the manufacture of a new intermediate by reduction thereof.

According to the invention we treat 2:4-dinitrophenylmercaptan with halogenoacetic acid, e. g., chloroacetic acid, in the presence of an alkaline carbonate or other mildly alkaline fixative for mineral acid to give the known 2:4-dinitrophenylthioglycollic acid. We then reduce this compound to obtain a new and valuable dyestuff intermediate, namely, 2-nitro-4-aminophenylthioglycollic acid. A convenient means of effecting this reduction is by means of an alkaline sulfide, but we do not confine ourselves to this reducing agent. Other reducing agents, as for example, nascent hydrogen may be used.

The following examples illustrate, but do not limit, the invention. The parts are by weight.

Example I

Two hundred two and five-tenths parts of 1-chloro-2:4-dinitrobenzene are converted to 2:4-dinitrophenylmercaptan by the method of Willgerodt, Berichte der deutschen chemischen Gesellschaft, 17, Ref. 322. The mercaptan paste obtained is condensed with sodium chloroacetate as follows: The mercaptan is suspended in 1500 parts of water with 108 parts of sodium carbonate and stirred at ordinary temperature. One hundred twenty parts of monochloroacetic acid are neutralized cold in 800 parts of water with sodium carbonate. The solution is added to the mercaptan liquor at 20° C. and the whole warmed to 80° C. in one hour. After stirring one hour at this temperature, the solution is filtered from suspended matter and the thioglycollic acid precipitated at 40° C. with hydrochloric acid. The 2:4-dinitrophenylthioglycollic acid is filtered off and reserved as paste. The dried product has melting point of 172° C.

The reduction of 2:4-dinitrophenylthioglycollic acid to 2-nitro-4-aminophenylthioglycollic acid is carried out as follows: Two hundred parts of 2:4-dinitrophenylthioglycollic acid are suspended in 2000 parts of water at 80° C. and dissolved by addition of ammonia. A solution of 280 parts of sodium sulfide crystals in 1000 parts of water is gradually added at 80° C. during one-half hour. During the addition, the solution becomes orange in color. After one-half hour at 80° C. to 85° C. the solution is cooled to 30° C. and treated with 300 parts of concentrated hydrochloric acid. The acidified liquor is stirred with 20 parts of charcoal, filtered from suspended matter and the nitroaminophenylthioglycollic acid precipitated from solution by neutralization to Congo red paper with ammonia. The product is filtered, washed with cold water, and dried at 50° C.

The product is an orange-yellow substance which dissolves readily in dilute aqueous acids and alkalies. When crystallized from hot water, orange leaves are obtained having melting point of 168° C.

Example II

Two hundred parts of 2:4-dinitrophenylthioglycollic acid are dissolved in 2000 parts of water at 80° C. by adding enough ammonia. Then 400 parts of 30% sodium hydrosulfide solution are added with stirring during five minutes. The solution is kept at 80° C. to 85° C. for half an hour. Reduction is then complete. The deep orange solution is acidified with hydrochloric acid and the nitroaminophenylthioglycollic acid isolated as described in Example I.

Example III

To 200 parts of 2:4-dinitrophenylthioglycollic acid, dissolved in aqueous ammonia as described above, are added 125 parts of ammonium chloride and a solution of 280 parts of sodium sulfide crystals in 1000 parts of water. The mixture is stirred at 80° C. for half an hour, cooled, acidified with hydrochloric acid, and the nitroaminophenylthioglycollic acid is isolated as in Example I.

Example IV

To 200 parts of 2:4-dinitrophenylthioglycollic acid, dissolved in aqueous ammonia at 80° C. as described above, is gradually added a solution of sodium trisulfide prepared by mixing 18.5 parts of sodium sulfide crystals and 5 parts of sulfur, and warming until the sulfur has dissolved. The solution is kept at 80° C. for a further half hour, cooled to 40° C. and the nitroaminophenylthioglycollic acid isolated as described in Example I.

Example V

To a solution of 200 parts of 2:4-dinitrophenylthioglycollic acid in 2000 parts of dilute aqueous ammonia at 80° C. 280 parts of magnesium sulfate crystals are added. A solution of 280 parts of sodium sulfide crystals in 1000 parts of water is now gradually added during half an hour, keeping the temperature at 80° C. After a further half hour, the solution is heated and the product isolated as described in Example I.

Other reducing agents which may be employed according to this invention are potassium sulfide, potassium hydrosulfide and potassium polysulfides. In general, alkaline sulfides are preferred. By "alkaline sulfides" is meant sulfides which have an alkaline reaction in water solution.

The products are especially valuable for use as intermediates in the production of dyes.

As many apparently widely different embodiments of this invention may be made without departing from the spirit and scope thereof, it is to be understood that we do not limit ourselves to the specific embodiments thereof except as defined in the appended claims.

We claim:

1. In a process of producing a thioglycollic acid, the step which comprises reducing 2:4-dinitrophenylthioglycollic acid with an alkaline sulfide.

2. A compound being most probably 2-nitro-4-aminophenylthioglycollic acid, said compound being an orange-yellow substance which dissolves readily in dilute aqueous acids and alkalies, and crystallizes from hot water in orange leaves having a melting point of about 168° C.

NORMAN HULTON HADDOCK.
FRANK LODGE.